United States Patent
Sunkara et al.

(10) Patent No.: US 9,515,901 B2
(45) Date of Patent: Dec. 6, 2016

(54) AUTOMATIC ASYNCHRONOUS HANDOFF IDENTIFICATION

(71) Applicant: AppDynamics, Inc., San Francisco, CA (US)

(72) Inventors: Bhaskar Sunkara, San Francisco, CA (US); Suraj Puvvada, San Jose, CA (US); Manoj Acharya, San Francisco, CA (US); Vinay Srinivasaiah, San Carlos, CA (US)

(73) Assignee: AppDynamics, Inc., San Francisco, CA (US)

( * ) Notice: Subject to any disclaimer, the term of this patent is extended or adjusted under 35 U.S.C. 154(b) by 436 days.

(21) Appl. No.: 14/058,200

(22) Filed: Oct. 18, 2013

(65) Prior Publication Data
US 2015/0113122 A1    Apr. 23, 2015

(51) Int. Cl.
G06F 15/173 (2006.01)
H04L 12/26 (2006.01)
G06F 9/48 (2006.01)

(52) U.S. Cl.
CPC ............. *H04L 43/04* (2013.01); *G06F 9/4843* (2013.01); *H04L 43/14* (2013.01)

(58) Field of Classification Search
CPC ............................... H04L 43/14; H04L 43/08
USPC ........................................................ 709/224
See application file for complete search history.

(56) References Cited

U.S. PATENT DOCUMENTS

| | | |
|---|---|---|
| 6,125,382 A | 9/2000 | Brobst et al. |
| 6,493,816 B1 * | 12/2002 | Munroe ................. G06F 9/465 |
| | | 707/999.102 |
| 6,651,108 B2 * | 11/2003 | Popp .................... G06F 9/4428 |
| | | 707/999.103 |
| 8,312,249 B1 | 11/2012 | Trumbull |
| 8,965,952 B1 | 2/2015 | Shatalin et al. |
| 2001/0034016 A1 | 10/2001 | Ziv-el et al. |
| 2002/0173997 A1 | 11/2002 | Menard et al. |
| 2003/0093551 A1 | 5/2003 | Taylor et al. |
| 2004/0006620 A1 | 1/2004 | Howard et al. |

(Continued)

FOREIGN PATENT DOCUMENTS

| | | |
|---|---|---|
| GB | 2 518 739 | 4/2015 |
| WO | WO 2015/058204 | 4/2015 |

OTHER PUBLICATIONS

PCT Application No. PCT/US2014/061402 International Search Report and Written Opinion dated Jan. 21, 2015.

(Continued)

*Primary Examiner* — Jason Recek
(74) *Attorney, Agent, or Firm* — Bachmann Law Group (57) ABSTRACT

Asynchronous handoffs between threads and other software components may be automatically detected, and the corresponding working objects may be tracked. The system may report monitoring information for an overall transaction that includes the original request and corresponding asynchronous requests. Automatically detecting asynchronous requests may include instrumenting a virtual machine, such as a Java Virtual Machine (JVM), to detect the creation of thread handoff objects and the object and/or thread execution. Thread handoff objects may automatically tracked, tracked based on data learned over time, tracked based on user input, and otherwise configured. In some embodiments, after detecting the creation of a thread handoff object, an identification of the object of the call may be identified as being tracked in another server or application.

29 Claims, 7 Drawing Sheets

(56) References Cited

U.S. PATENT DOCUMENTS

| | | | |
|---|---|---|---|
| 2004/0081183 A1* | 4/2004 | Monza | H04L 41/06 370/412 |
| 2004/0153825 A1 | 8/2004 | Morimoto et al. | |
| 2005/0039190 A1 | 2/2005 | Rees et al. | |
| 2005/0165584 A1 | 7/2005 | Boody et al. | |
| 2005/0273709 A1 | 12/2005 | Lough et al. | |
| 2006/0041539 A1 | 2/2006 | Matchett et al. | |
| 2006/0168526 A1 | 7/2006 | Stirbu | |
| 2006/0271395 A1† | 11/2006 | Harris | |
| 2007/0027742 A1 | 2/2007 | Emuchay et al. | |
| 2007/0088668 A1 | 4/2007 | Larab et al. | |
| 2008/0062993 A1 | 3/2008 | Levy et al. | |
| 2008/0098378 A1 | 4/2008 | Kilbane et al. | |
| 2009/0320030 A1* | 12/2009 | Ogasawara | G06F 9/4825 718/102 |
| 2010/0088404 A1 | 4/2010 | Mani et al. | |
| 2010/0100890 A1* | 4/2010 | Dar | G06F 9/455 719/314 |
| 2010/0138703 A1 | 6/2010 | Bansal et al. | |
| 2010/0162204 A1 | 6/2010 | Baumann et al. | |
| 2010/0287541 A1 | 11/2010 | Saunders et al. | |
| 2012/0047494 A1 | 2/2012 | Unrein et al. | |
| 2012/0167057 A1 | 6/2012 | Schmich et al. | |
| 2012/0297371 A1† | 11/2012 | Greifeneder | |
| 2012/0304172 A1 | 11/2012 | Greifeneder et al. | |
| 2013/0067074 A1 | 3/2013 | Allen et al. | |
| 2013/0117132 A1 | 5/2013 | Padwal et al. | |
| 2015/0067146 A1† | 3/2015 | Raker | |

OTHER PUBLICATIONS

U.S. Appl. No. 14/530,633 Office Action mailed Mar. 12, 2015.
United Kingdom Application No. GB1413464.7, Search Report dated Jan. 27, 2015.

* cited by examiner
† cited by third party

AUTOMATIC ASYNCHRONOUS HANDOFF IDENTIFICATION

BACKGROUND OF THE INVENTION

The World Wide Web has expanded to make web services a part of consumers' daily lives. Web services may be provided by a web application which uses one or more services to handle a transaction. The applications may be distributed over several machines. A content page (e.g., a web page) may be rendered in a network browser application and may provide information from content requested by several content page elements. In some content pages, the page elements may be loaded from different remote applications asynchronously. For example, in response to a request, a content page may initiate multiple asynchronous requests.

Current application tracking tools do not track the multiple asynchronous requests. Typical systems monitor a backend transaction for a single content page. As a result, when multiple elements initiate different processes and services, they are not tracked using monitoring systems of the prior art. This provides an inadequate view of the true nature of content page rendering and transactions that are part of providing the content page.

There is a need in the art for application monitoring with improved monitoring capabilities.

SUMMARY OF THE CLAIMED INVENTION

The present technology may automatically detect asynchronous handoffs between threads and other software components. The system may report monitoring information for an overall transaction that includes the original request and corresponding asynchronous requests. Automatically detecting asynchronous requests may include instrumenting a virtual machine, such as a Java Virtual Machine (JVM), to detect the creation of thread handoff objects and the object and/or thread execution. Thread handoff objects may automatically tracked, tracked based on data learned over time, tracked based on user input, and otherwise configured. In some embodiments, after detecting the creation of a thread handoff object, an identification of the object of the call may be identified as being tracked in another server or application.

An embodiment may include a method for monitoring a business transaction. The method may automatically detect construction of an object by an agent on a server. The object may be configured to handoff control of a transaction from a first thread to a second thread. The constructed object may be associated with a monitoring parameter and the second thread may be associated with the monitoring parameter.

The method may be implemented as a system or as an executable program implemented on a computer readable medium.

DETAILED DESCRIPTION

The present technology monitors a network or web application provided by one or more distributed applications. The web application may be provided by one or more web services each implemented as a virtual machine or one or more applications implemented on a virtual machine. Asynchronous handoffs may be automatically detected on one or more virtual machines by tracking working object creation and execution. Detecting asynchronous handoffs may assist a monitoring system with identifying and tracking distributed business transactions for content pages and other modules that have multiple asynchronous requests.

Automatically detecting asynchronous requests may include instrumenting a virtual machine, such as a Java Virtual Machine (JVM), to detect the creation of thread handoff objects. Thread handoff objects may be known ahead of time, learned over time, provided by a user, or otherwise identified. For example, a thread handoff object may include java calls such as java.runable, java.callable, and java.thread.

Figure 1:
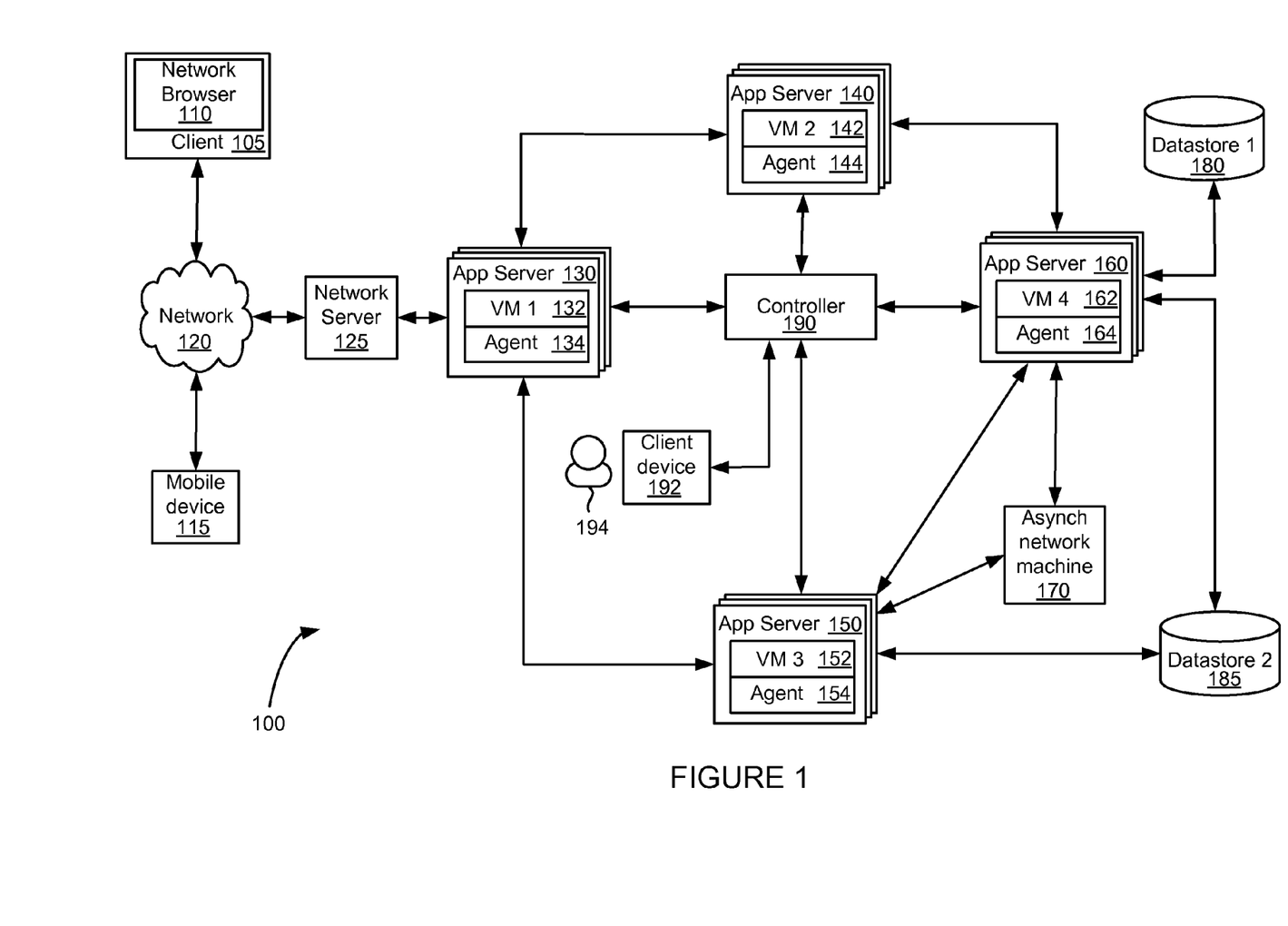
FIG. 1 is a block diagram of an exemplary system for monitoring business transactions.

FIG. 1 is a block diagram of an exemplary system for monitoring business transactions. System 100 of FIG. 1 includes client device 105, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a wireless network, a cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may include a mapping table for storing correlated pairs of object identifiers and monitoring parameters. When an instrumented thread handoff object constructor is created, the agent may detect the creation and store an object ID and monitoring data for the created object. The monitoring ID may be created by the agent or other entity. When an instrumented object run method is executed on the created object, the monitoring parameter stored for the object ID is associated with the thread handling execution of the object, and the monitoring parameter may be included in the object execution locally or by a remote application. By associating monitoring parameter with the executing object, the executing object can be monitored. The monitored data is reported to a controller with the monitoring parameter, and the distributed (e.g., "continuing") transaction may be stitched together by a controller which may correlate the data from different agents and applications.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Figure 2:
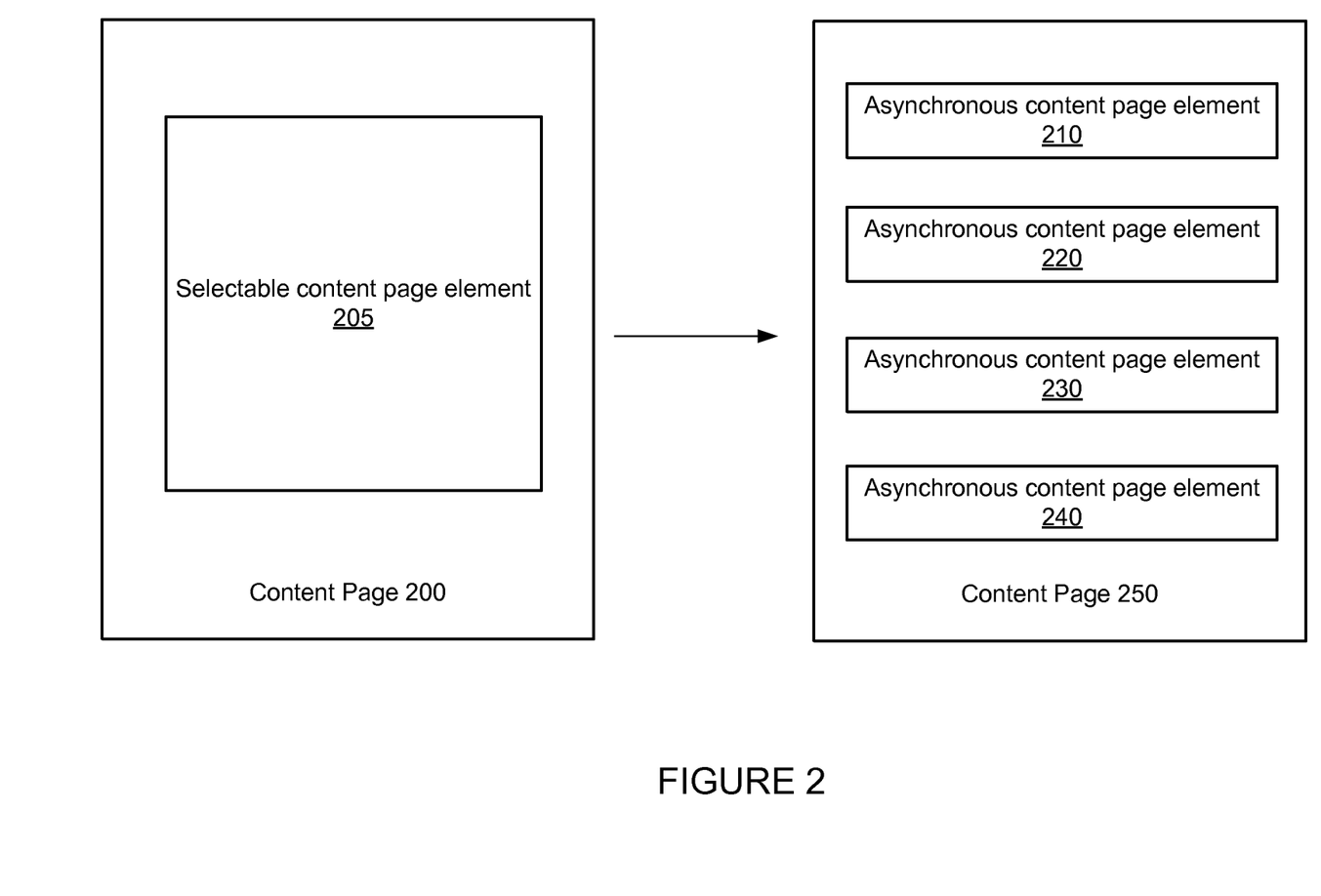
FIG. 2 is a block diagram of a content page with multiple elements.

FIG. 2 is a block diagram of a content page with multiple elements. FIG. 2 includes content pages 200 and 250. Each of content pages 200 and 250 may be rendered in a network browser application from content received from one or more remote applications, such as web service applications.

Content page 200 includes a selectable content page element 205. When selected by a user, the network browser providing content page 200 may replace that page with content page 250. The content page 250 includes asynchronous content page elements 210, 220, 230, and 240.

In embodiments, one of more of asynchronous content page elements 210-240 may initiate an asynchronous call for content when a network browser is rendering content page 250. For example, one or more of the content page elements may place a call to a web service, resources, remote object, or other element. Each call made by an asynchronous content page element may be independent from operation of the other asynchronous content page elements and may be associated with its own distributed transaction. As such, when content page 250 is rendered, content page elements 210-240 may operate in parallel to retrieve content to be rendered in content page 200 within a network browser application.

As the content page elements work in parallel to receive content, a thread associated with content page 200 may handoff control to a separate thread associated with each of the individual asynchronous content page elements. Similarly, each content page element thread may handoff control to another thread, for example a thread at a remote application. Application monitoring systems of the prior art have no way to associate a request received for selectable content page element 205 and one or more asynchronous requests associated with asynchronous content page elements 210-240. The present technology is automatically able to track the thread handoff objects to provide for better tracking and correlation of the overall process (distributed transaction or continuing transaction) of providing content in content page 250.

Figure 3:
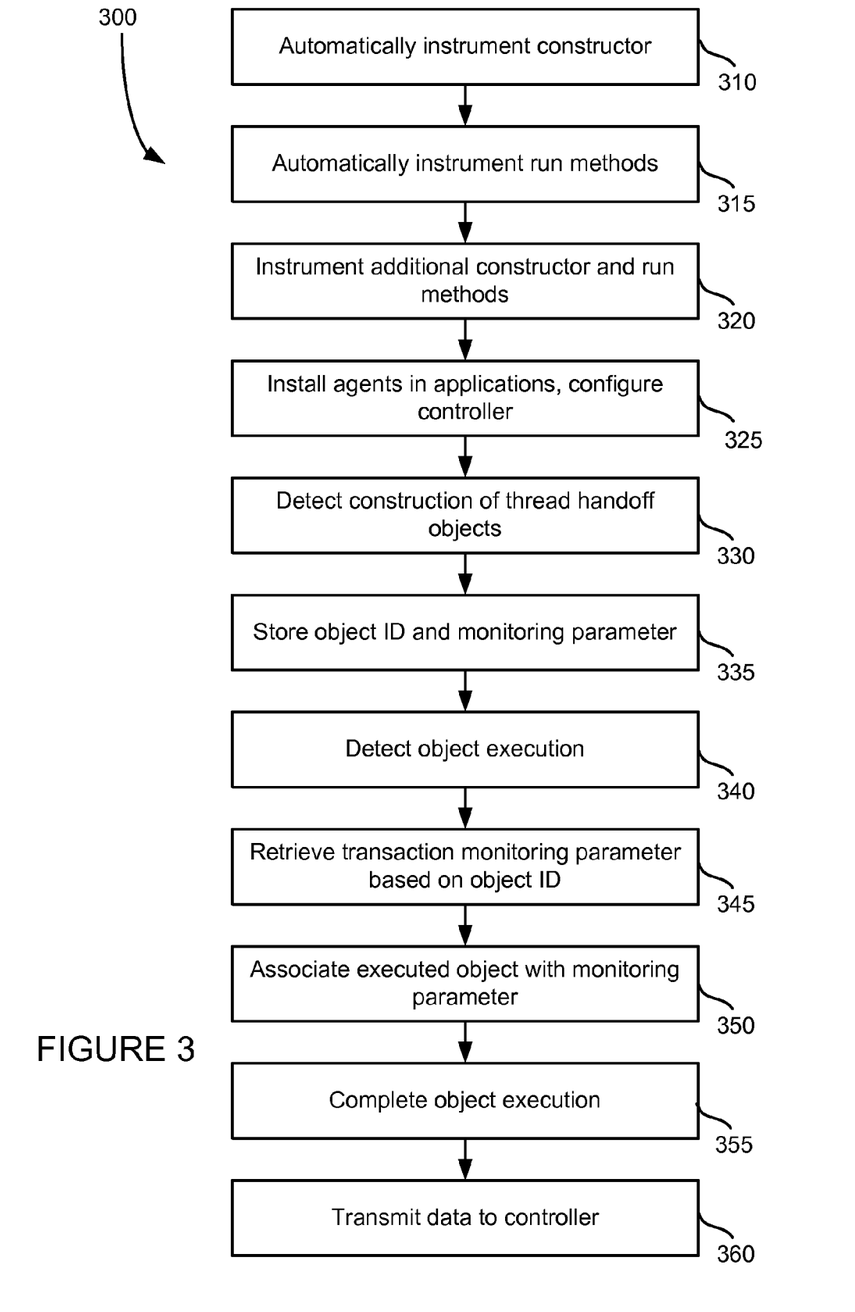
FIG. 3 is an exemplary method for monitoring business transactions.

FIG. 3 is an exemplary method for monitoring business transactions. First, constructor objects may be automatically instrumented at step 310. The instrumentation may include instrumenting application server byte code or object code. The constructors may be instrumented such that when they subsequently create an object, in particular a thread handoff object, the object can be tracked. A thread handoff object may be any object that may be likely to result in a new thread being allocated to take control of a process from an existing thread. Examples of automatically instrumented constructors include those that construct objects of callable, runable, and thread. The new thread may be a child thread of the original thread. Though a virtual machine is discussed in reference to step 310, other portions of an application may be instrumented in order to detect the creation of a thread handoff object. More details for instrumenting bytecode and/or object code to detect creation of a thread handoff object are discussed with respect to the method of FIG. 4.

Run methods may be automatically instrumented at step 315. The run methods may include one or more methods that execute the thread handoff objects which are instrumented at step 310. For example, for objects of callable, runnable, and thread, the methods that execute them may include Call, Run and Thread methods. The constructor of step 310 and methods of step 315 may be automatically instrumented, regardless of user input, system behavior, and other factors.

Additional constructors and run methods may be constructed at step 320. The additional constructors and run methods may not be automatically constructed as those in steps 310 and 315, but rather may be constructed based on user input, learning of system behavior over time, and other factors.

Additional information regarding instrumenting code, install agents, and monitoring a transaction is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Agents may be installed in applications and a controller may be configured at step 325. The agents may be installed on an application server and within a virtual machine, within an application, or outside a virtual machine. The agent may be added by byte code instrumentation, by downloading code to be installed on to the application server, or by some other method. At some point, controller 190 may also be configured. Configuring controller 190 may include loading software onto controller 190 for communicating with one or more agents, processing runtime data, reporting performance information, and performing other operations. Operation of some controller 190 is discussed in more detail with respect to FIG. 7.

Construction of a thread handoff object may be detected at step 330. The instrumented constructor may notify an agent when the constructor creates an object. The object may be one that is created by a constructor that is automatically instrumented at step 310 or instrumented non-automatically a step 320.

In some instances, when detected, a call to execute a thread handoff object may be modified with monitoring parameters. An agent on the application server making the call may modify the call as part of a business transaction. The agent may modify the call with monitoring parameters, such as for example an application identifier, transaction identifier, request identifier, caller chain information, and diagnostic status. In some embodiments, the call is modified by adding thread information such as monitoring parameters from a "thread local" file to the outgoing thread. The monitoring parameter data may be added to the "thread local" file by an agent. More detail for step 330 is discussed with respect to the method of FIG. 5.

Once a thread handoff object has been created, an object identifier and a monitoring parameter are stored at step 335. The object identifier may identify the created object, for example with a unique identifier. The monitoring parameter may identify the transaction ID associated with a request that ultimately initiated the object creation. The object identifier and a monitoring parameter may be stored in a memory map by an agent on the virtual machine or other node which may execute the created object.

Execution of an object may be detected at step 340. Object execution may be detected when an instrumented run method is called on an object such as a thread handoff object that was created at step 330. The instrumented call method may inform an agent when an object is executed by that method.

The transaction monitoring parameter associated with the execute object is retrieved at step 345. An agent may receive the object execution message, which includes an identifier for the object being executed. The agent may retrieve the monitoring parameter that corresponds to the object identifier. The agent may then associate the executed object with the retrieved monitoring parameter at step 350. In some instances, the agent may associate the executed object with the monitoring parameter by associating the monitoring parameter with a thread that is executing the object.

Object execution is completed at step 355. Execution of the object may include handing off control of object execution to another thread, either locally on the same virtual machine or application that called the object or remotely on another virtual machine or application. In any case, the monitoring parameters may stay associated with the object execution. In some instances, execution of the object may include creating and executing another thread handoff object. When this occurs, the additional thread handoff object is associated with the monitoring parameter as the previous object was, the execution of the additional object completes, and the previous thread handoff object may execute to completion based on the additional thread handoff object execution results.

Data may be transmitted to a controller at step 360. The data may include monitoring data, aggregated runtime data, and other data. The data may be reported by an agent that monitors the thread handoff object creation and execution. More information for transmitting data to a controller is discussed with respect to the method of FIG. 6.

Figure 4:
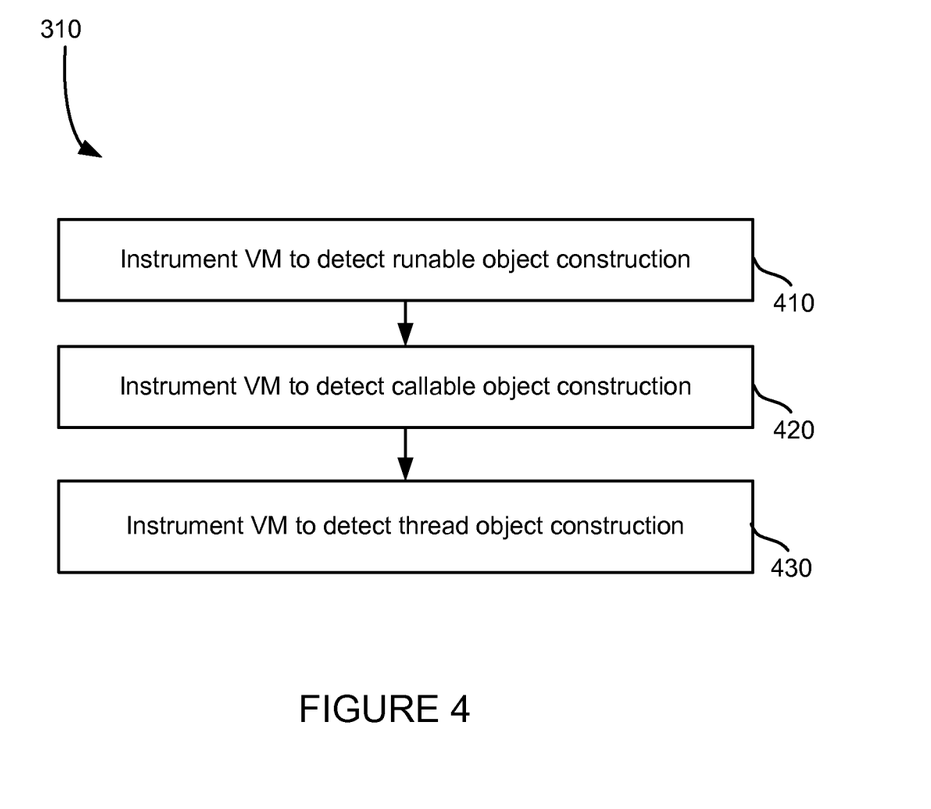
FIG. 4 is an exemplary method for automatically instrumenting constructor objects.

FIG. 4 is an exemplary method for automatically instrumenting constructor objects. The method of FIG. 4 provides more detail for step 310 of the method of FIG. 3. A virtual machine is instrumented to detect a runable object constructor at step 410. A runnable object may be known as a thread hand off object, and creating of the object would be desirable to monitor. The virtual machine may be instrumented to detect a callable object constructor at step 420. At step 430, the virtual machine may be instrumented to detect a thread object constructor.

The instrumentation at steps 410-430 may detect objects that are likely to handover control from one thread to another. Instrumentation may be performed such that when the constructor creates an object, code inserted into the constructor an agent of the constructor and the object name.

The steps of the method of FIG. 4 may be performed in any order and may be performed individually. For example, callable object constructors may be instrumented before runnable objects, or only callable object constructors may be instrumented for a particular application. Additionally, other object constructors may be instrumented in addition to those listed in the steps of the method of FIG. 4.

Figure 5:
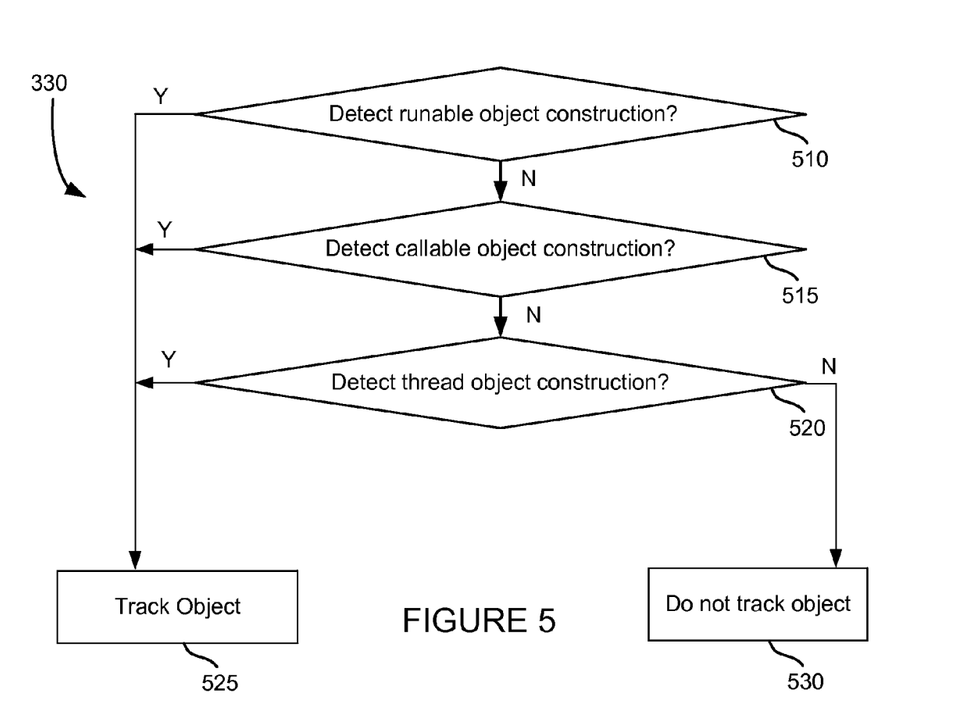
FIG. 5 is an exemplary method for detecting construction of thread handoff objects.

FIG. 5 is an exemplary method for detecting construction of thread handoff objects. The method of FIG. 5 provides more detail for step 330 of the method of FIG. 3. Steps 510-520 begin with determining whether object construction is detected which is likely to perform a handoff. At step 510, a determination is made as to whether construction of a runnable object is detected. If a runable object is detected, the method of FIG. 5 continues to step 525 where the object is tracked. Tracking the object may include storing data about the object in a memory map. A determination is made as to whether construction of a callable object is detected at step 515 If construction of a callable object is detected, the constructed object is tracked at step 525. A determination may be made as to whether construction of a thread object is detected at step 520. If construction of a thread object is not detected, then the method of FIG. 5 ends without tracking the construction of an object. If construction of a thread object is detected at step 520, the detected object may be tracked at step 525.

Figure 6:
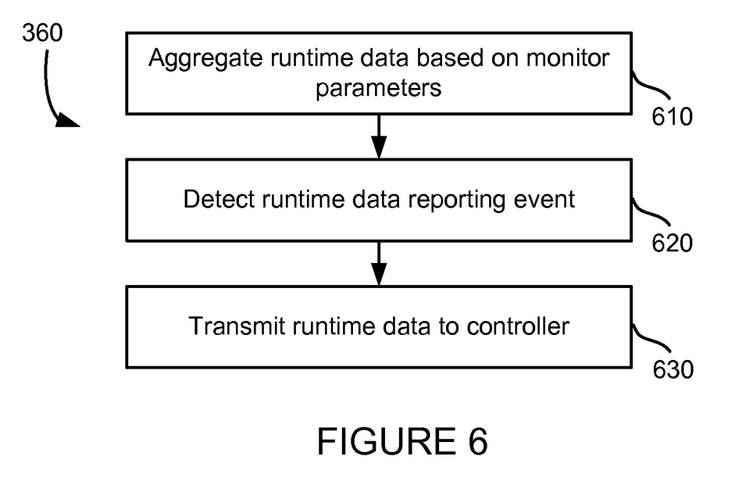
FIG. 6 is an exemplary method transmitting data to a controller.

FIG. 6 is an exemplary method for transmitting data to a controller. Runtime data may be aggregated at step 610. The runtime data collected by an agent may be aggregated based on monitoring parameters and averaged over a period of time, for example one minute.

Runtime data associated with the call may be stored as it is received. In some embodiments, the runtime data may indicate the response time for the call to complete. The runtime data may include timing information associated with a business transaction, call chain and other parameter information, and other data. An agent may receive or retrieve a timestamp corresponding to the beginning and the end of an application call, method call, and other operations. Once the call is completed, a response time may be generated for the overall call as well as intervening calls to other applications.

A runtime data reporting event may be detected at step 620. The runtime reporting event may be any of several events, for example the expiration of a timer, a state of one or more resources of the application server reporting the runtime data, or another event. Runtime data may then be transmitted to a controller 190 by an agent at step 630. Controller 190 may receive data from one or more agents, process the data, and provide monitoring information regarding the system being monitored.

Figure 7:
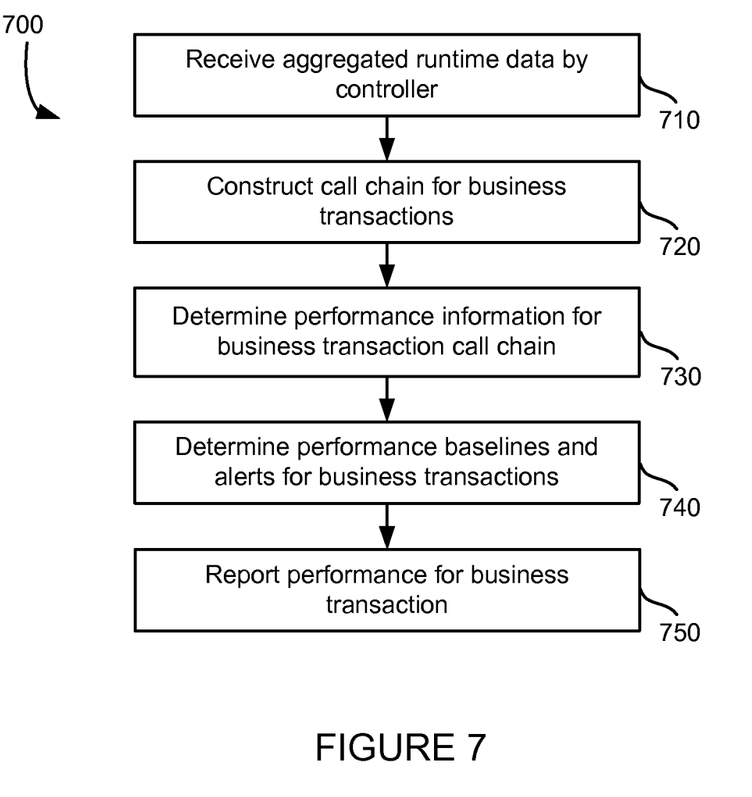
FIG. 7 is an exemplary method of operation for a controller.

FIG. 7 is an exemplary method of operating for a controller. Aggregated runtime data may be received from one or more agents at step 710. The aggregated runtime data may be received periodically, based upon an event, based upon load size of the data, or based on some other criteria. The aggregated runtime data may indicate a business transaction, call chain data, time stamp data, and other data. The business transaction may be associated with a request. The call chain data of the aggregated data may include the call chain data received in the header of a request, if any, along with an identifier of the application or virtual machine processing the request. Aggregated data may be sent for each call chain combination.

A call chain for business transactions may be constructed from the received aggregated data at step 720. The call chain may be constructed by connecting data associated with sections of a business transaction based on call chain data in the received aggregated data.

Constructing a call chain may include associating one or more asynchronous requests with a parent request. For example, a request received in a content page at a client may result in multiple asynchronous requests initiated by multiple threads which differ from the thread handling the original request. Per the technology described herein, the multiple asynchronous requests may be tied to the original request, all of which are handled by different threads. The controller may associate the performance data and other data for the original request and the subsequent asynchronous requests as a single distributed or continuing transaction for further analysis.

Performance information may be determined for the business transaction at step 730. The performance information may indicate the total response time for the business transaction and local response times by each node (e.g., processing time by each application server or virtual machine in the business transaction), as well as time periods between virtual machines within the system, as well as whether the performance was acceptable or unacceptable.

Performance baselines and alerts may be determined for business transactions based on the determined performance at step 740. In some embodiments, an average or baseline performance may be determined for a section of a business transaction, for example by averaging performance data for each section over a period of time. The performance may be reported for a business transaction at step 750.

Figure 8:
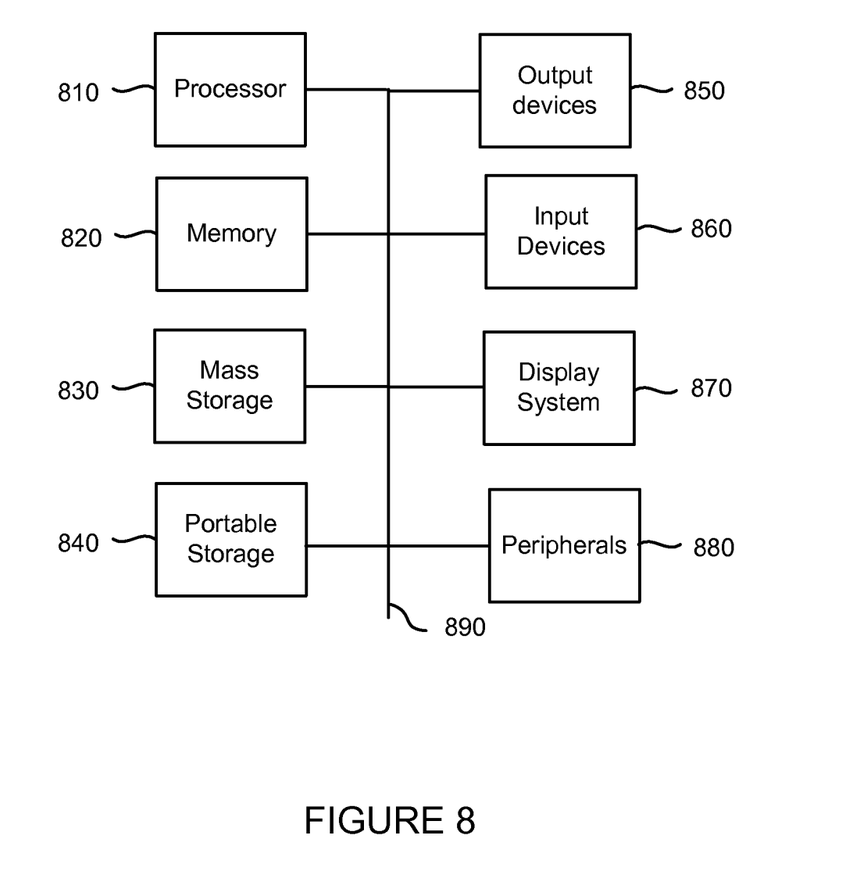
FIG. 8 is a block diagram of an exemplary computing device.

FIG. 8 is a block diagram of an exemplary computing device. System 800 of FIG. 8 may be implemented in the contexts of the likes of application servers 130-160, network server 125, database 180 and 185, and clients 105 and 192. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

A computing system similar to that of FIG. 8 may be used to implement mobile device 115, but may contain additional elements commonly found in such mobile devices. For example, a system implementing mobile device 115 may include, in addition to the elements of the system of FIG. 8, one or more antennas and related circuitry for wireless communication, a speaker, touch screen, and other components for implementing mobile devices such as smart phones, tablet computers and the like.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for detecting asynchronous thread handoff requests associated with monitoring a business transaction, the method including:

automatically detecting construction of a thread handoff object by an agent on a server that performs at least a portion of the business transaction monitoring, the thread handoff object configured to handoff control of the business transaction from a first thread to a second thread;

storing a correlated pair of an object identifier and a monitoring parameter for the thread handoff object responsive to the detecting of the construction of the thread handoff object, the object identifier identifying the constructed thread handoff object;

automatically detecting an execution of the thread handoff object identified by the object identifier, wherein the execution of the thread handoff object results in the handoff of control of the business transaction from the first thread to the second thread;

retrieving the stored monitoring parameter correlated with the object identifier identifying the executed thread handoff object;

associating the constructed thread handoff object with the retrieved monitoring parameter; and associating the retrieved monitoring parameter with the second thread due to the thread handoff from the first thread.

2. The method of claim 1, wherein the thread handoff object is a callable object.

3. The method of claim 1, wherein the thread handoff object is a runnable object.

4. The method of claim 1, wherein the thread handoff object creates a child thread to execute as part of the business transaction.

5. The method of claim 1, wherein the thread handoff object is initiated by a first independently executing content page element of a plurality of independently executing content page elements.

6. The method of claim 1, wherein the thread handoff object construction is detected by the agent executing on the server that constructs the thread handoff object.

7. The method of claim 1, wherein the transaction is performed by the first thread that constructs the thread handoff object and the second thread that is initiated by the thread handoff object.

8. The method of claim 7, including wherein monitoring the business transaction includes monitoring the first thread and the second thread.

9. The method of claim 1, wherein the monitoring parameter includes:

an application identifier, a transaction identifier, a request identifier, or caller chain information.

10. The method of claim 1, wherein the execution of the thread handoff object includes creating and executing another thread handoff object.

11. A non-transitory computer readable storage medium having embodied thereon a program, the program being executable by a processor to perform operations for monitoring a business transaction including:

automatically detecting construction of a thread handoff object by an agent on a server that performs at least a portion of the business transaction monitoring, the thread handoff object configured to handoff control of the business transaction from a first thread to a second thread;

storing a correlated pair of an object identifier and a monitoring parameter for the thread handoff object responsive to the detecting of the construction of the thread handoff object, the object identifier identifying the constructed thread handoff object;

automatically detecting an execution of the thread handoff object identified by the object identifier, wherein the execution of the thread handoff object results in the handoff of control of the business transaction from the first thread to the second thread;

retrieving the stored monitoring parameter correlated with the object identifier identifying the executed thread handoff object;

associating the constructed thread handoff object with the retrieved monitoring parameter; and associating the retrieved monitoring parameter with the second thread due to the thread handoff from the first thread.

12. The non-transitory computer readable storage medium of claim 11, wherein the thread handoff object is a callable object.

13. The non-transitory computer readable storage medium of claim 11, wherein the thread handoff object is a runnable object.

14. The non-transitory computer readable storage medium of claim 11, wherein the thread handoff object creates a child thread to execute as part of the business transaction.

15. The non-transitory computer readable storage medium of claim 11, wherein the thread handoff object is initiated by a first independently executing content page element of a plurality of independently executing content page elements.

16. The non-transitory computer readable storage medium of claim 11, wherein the thread handoff object construction is detected by an agent executing on a server that constructs the thread handoff object.

17. The non-transitory computer readable storage medium of claim 11, wherein the business transaction is performed by the first thread that constructs the thread handoff object and the second thread that is initiated by the thread handoff object.

18. The non-transitory computer readable storage medium of claim 17, wherein monitoring the business transaction includes monitoring the first thread and the second thread.

19. The non-transitory computer readable storage medium of claim 11, wherein the monitoring parameter includes:
an application identifier, a transaction identifier, a request identifier, or caller chain information.

20. A system for monitoring a business transaction, the system comprising: a processor;
a memory; and
one or more modules stored in memory and executable by the processor to perform operations including:
automatically detect construction of a thread handoff object by an agent on a server that performs at least a portion of the business transaction monitoring, the thread handoff object configured to handoff control of the business transaction from a first thread to a second thread;
store a correlated pair of an object identifier and a monitoring parameter for the thread handoff object responsive to the detecting of the construction of the thread handoff object, the object identifier identifying the constructed thread handoff object;
automatically detect an execution of the thread handoff object identified by the object identifier, wherein the execution of the thread handoff object results in the handoff of control of the business transaction from the first thread to the second thread;
retrieve the stored monitoring parameter correlated with the object identifier identifying the executed thread handoff object;
associate the constructed thread handoff object with the retrieved monitoring parameter; and
associate the retrieved monitoring parameter with the second thread due to the thread handoff from the first thread.

21. The system of claim 20, wherein the thread handoff object is a callable object.

22. The system of claim 20, wherein the thread handoff object is a runnable object.

23. The system of claim 20, wherein the thread handoff object creates a child thread to execute as part of the transaction.

24. The system of claim 20, wherein the thread handoff object is initiated by a first independently executing content page element of a plurality of independently executing content page elements.

25. The system of claim 20, wherein the object construction is detected by an agent executing on a server that constructs the thread handoff object.

26. The system of claim 20, wherein the transaction is performed by the first thread that constructs the thread handoff object and the second thread that is initiated by the thread handoff object.

27. The system of claim 26, wherein the one or more modules are executable to monitor the first thread and the second thread.

28. The system of claim 20, wherein the monitoring parameter includes:
an application identifier, a transaction identifier, a request identifier, or caller chain information.

29. The system of claim 20, wherein the execution of the thread handoff object includes creating and executing another thread handoff object.

* * * * *